3,473,899
Patented Oct. 21, 1969

3,473,899
PRODUCTION OF ALKALI METAL
BOROHYDRIDES
Hal B. H. Cooper, 4234 Chevy Chase Drive,
Pasadena, Calif. 91103
Filed Oct. 3, 1967, Ser. No. 672,606
Int. Cl. C01b 6/08
U.S. Cl. 23—361                                     21 Claims

ABSTRACT OF THE DISCLOSURE

A process for the production of alkali metal borohydrides, which involves the steps of (1) reducing an alkali metal boron oxide composition with a carbonaceous material to produce a reduced boron material and an elemental alkali metal;
(2) halogenating the reduced boron material with a halogenating agent selected from the group consisting of a halogen and hydrogen halide to produce boron trihalide;
(3) reacting the boron trihalide with a stoichiometric excess of hydrogen under hydrogenating conditions to produce dihaloborane;
(4) disproportionating the dihaloborane to diborane and recovering a diborane product;
(5) reacting the alkali metal with hydrogen to produce alkali metal hydride; and
(6) reacting the diborane with the alkali metal hydride to produce alkali metal borohydride.

BACKGROUND OF THE INVENTION

Field of the invention

Figure 1:
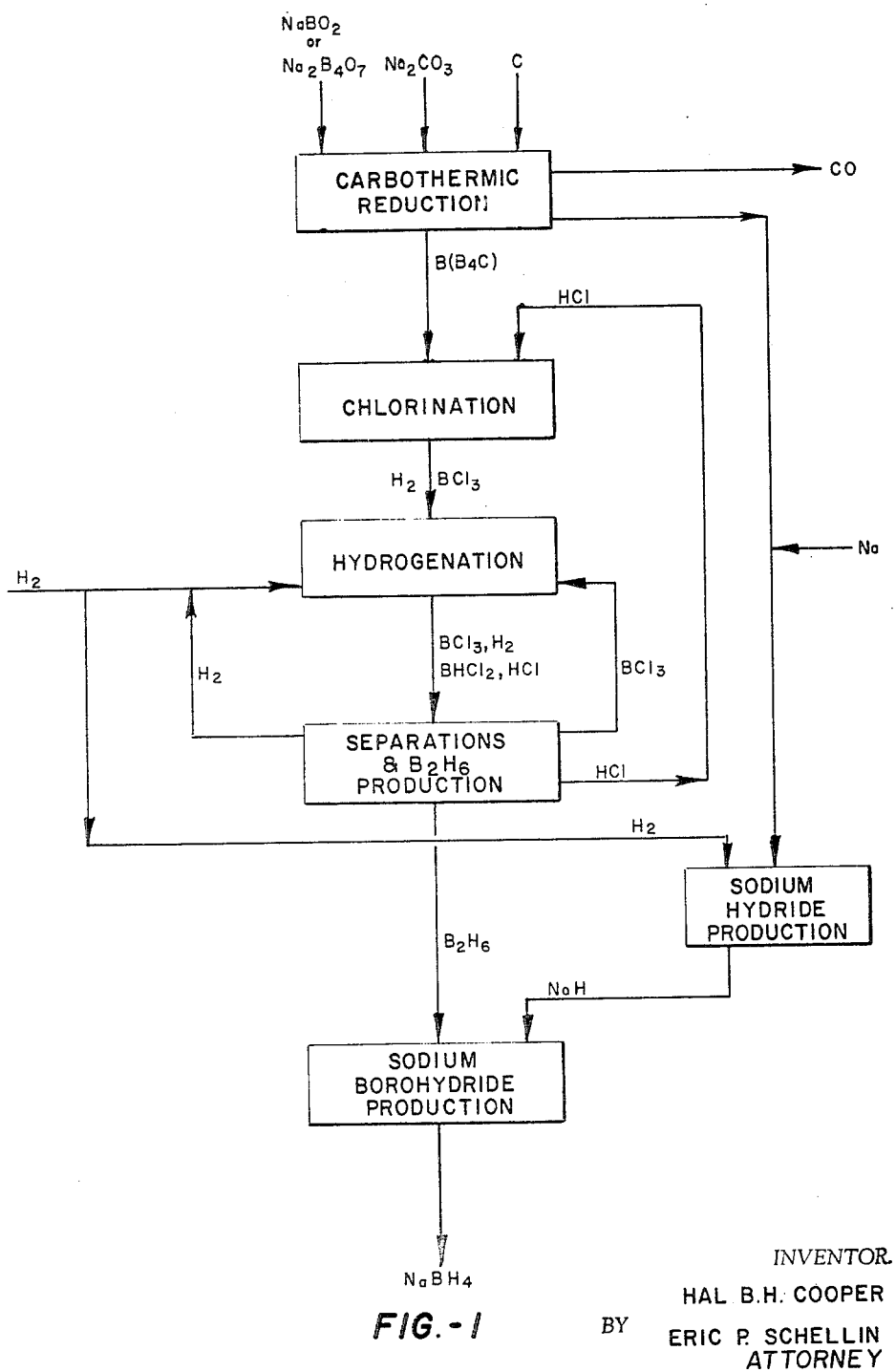

This invention relates to a novel and improved method for the preparation of sodium borohydride and other alkali metal borohydrides.

The alkali metal borohydrides are unique materials in their ability to carry large amounts of hydrogen in a safe and innocuous form. Sodium borohydride in an exceptionally effective bleaching agent and pulp brightness stabilizer through its powerful reducing effect on carbonyl groups contained in cellulosic products. It is highly effective for the removal of dyes and inks from reclaimed paper or textiles. The material is particularly attractive as a selective reducing agent for various organic materials. For example, it offers great promise as the reducing agent in vat dying operations. It may be employed for the stereospecific hydrogenation of ketosteroids and streptomycin and employed in the reduction reaction of various aromatic nitrogen compounds. It can serve as an excellent antioxidant or reducing agent, and can replace practically all uses of the hydrosulfites against which it can offer a major economic advantage. In addition, sodium and lithium borohydrides can be used for the generation of high purity hydrogen through reaction with water. The latter characteristics of sodium borohydride permits it to serve in the foaming of rubber and various plastics. The borohydrides offer great potential as a fuel in fuel cell systems. For example, sodium borohydride offers an available hydrogen content of 21 percent hydrogen and lithium borohydride close to 37 percent.

Sodium borohydride has not achieved its indicated widespread usage simply because of its high cost. The selling prices of sodium borohydride is necessarily pegged to the cost of metallic sodium. The commercial routes now available for the production of sodium borohydride each require four mols of sodium for each mol of sodium borohydride produced. Consequently, a decisive consideration in establishing the long term cost of sodium borohydride is the cost of the metallic sodium used in its manufacture.

Description of the prior art

The two primary routes for the production of sodium borohydride have been developed by Farbenfabriken Bayer AG at its Leverkusen, Germany, plant and by Metal Hydrides of Beverly, Mass.

The Bayer process involves a reaction of borax and quartz sand with hydrogen and metallic sodium to form sodium borohydride. The overall reaction equation is as follows:

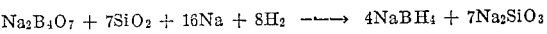

$$Na_2B_4O_7 + 7SiO_2 + 16Na + 8H_2 \longrightarrow 4NaBH_4 + 7Na_2SiO_3$$

Anhydrous sodium tetraborate and silica are fed to a rotating smelting furnace where a fused sodium borosilicate glass is produced. From the rotating furnace the material goes to open chilling pans where it is solidified. The borosilicate glass is finely ground in roller mills and passed to a storage hopper. The borosilicate is very hard and can only be ground with great wear on the grinding equipment. The sodium borosilicate glass and sodium are then reacted in a reaction vessel under a blanket of hydrogen at a pressure of approximately 3 atm. and at a temperature of 450–500° C. The mix from the reactor is then discharged into an agitator-equipped extractor where aqueous ammonia dissolves the sodium borohydride, separating it from sodium silicate. The solution is fed to a dryer where the ammonia is driven off and condensed for reuse. The sodium borohydride crystals are further dried and discharged for packaging.

In contrast to the Bayer solid phase route, the other commercially practiced process for the production of sodium borohydride involves reacting sodium hydride dispersed in an inert mineral oil with trimethyl borate in accordance with the following equation:

$$4NaH + B(OCH_3)_3 \longrightarrow NaBH_4 + 3NaOCH_3$$

The extraction of the sodium borohydride from the reaction mix must be with a solvent not miscible with oil. Liquid ammonia is perhaps the least expensive extractant and also the one exhibiting highest solubility for sodium borohydride. However, with ammonia high pressure equipment is necessary and reextractions and recrystallizations are normally required, because of contamination by the byproduct sodium methylate. It is also reported that diethyleneglycoldimethyl ether may be employed as the extractant solvent because of its lower volatility and higher flash point.

Thus, it is seen the liquid phase route using sodium hydride and methyl borate as reactants imposes some important cost limitations on sodium borohydride, and as in the Bayer solid phase route, four mols of sodium are necessarily employed for each mol of sodium borohydride. The foregoing two processes and other prior art processes for the production of sodium borohydride and a discussion of the economics involved are discussed in detail in an article entitled "Na Borohydride: Can Cost Be Lowered?" Canadian Chemical Processing, 47, #12, 57–58 and 62 (1963).

Summary of the invention

The process of the invention for the production of alkali metal borohydrides offers major economic advantages over presently used technology. A principal advantage of the process is that only one atom of alkali metal is employed to produce a mol of sodium borohydride or other alkali metal borohydride. Further, for example, in the instance where borax is used for the manufacture of sodium borohydride, one-half of the sodium is obtained at basically no cost from the naturally occurring boron source, and the rest of the sodium may optionally be produced from low cost soda ash. An alternate raw material source is sodium metaborates for the manufacture of sodium borohydride. Another raw material is sodium orthoborate. Material sources for lithium borohydride, potassium borohydride, rubidium borohydride and cesium borohydride include their corresponding metaborate, orthoborate, and tetraborate salts. A preferred embodiment of the process of the invention for the manufacture of sodium borohydride is shown in the following equations:

(1) $Na_2B_4O_7 + 8C \longrightarrow 2Na + B_4C(\text{or } 4B) + 7CO$

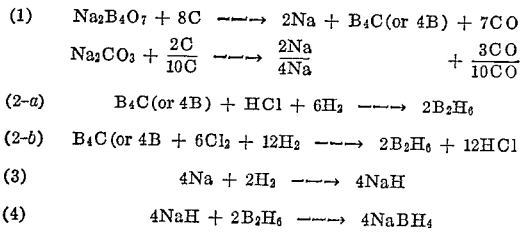

(2-a) $B_4C(\text{or } 4B) + HCl + 6H_2 \longrightarrow 2B_2H_6$ (2-b) $B_4C(\text{or } 4B + 6Cl_2 + 12H_2 \longrightarrow 2B_2H_6 + 12HCl$ (3) $4Na + 2H_2 \longrightarrow 4NaH$ (4) $4NaH + 2B_2H_6 \longrightarrow 4NaBH_4$ It will be appreciated that boron oxide compositions of other alkali metals may be substituted for the sodium tetraborate of the above equations.

The process of the invention is based on a reduced form of boron (oxygen-free) such as boron carbide or elemental boron. Such materials can be manufatcured at low cost, particularly as by the process and equipment of my copending U.S. patent application Ser. No. 613,373, filed Dec. 28, 1966, which is a continuation in part application of the earlier filed patent application Ser. No. 498,061, filed Oct. 19, 1965. The foregoing applications are incorporated by reference herein. Ser. No. 613,373 discloses a carbothermic reduction process for the production of alkali metal and a reduced boron compound in high yields and with high efficiency, utilizing a moving or agitated bed of electrically-conductive particles to heat a reducible sodium boron oxide or other reducible alkali metal boron oxide composition such as anhydrous borax and a carbon reducing material. Preferably, the electrically-conductive particles and carbon reducing material are the same composition. An electric current is passed through the bed, heating it to a temperature in excess of about 900° C., thus accomplishing reduction of the alkali metal boron oxide material to elemental alkali metal, which is removed in an effluent gas stream from the bed, and a reduced solid boron material which may be in part elemental boron and boron carbide. The reduced solid boron material is removed from the base of the furnace reactor and separated from the electrically conductive particles. Further details on the carbothermic reduction of the sodium boron oxide material to produce the reduced solid boron material and elemental sodium are set forth in pending application Ser. No. 613,373. Other possible carbothermic processes may be employed for the production of the alkali metal and boron, for example, high temperature batch reduction of borax with carbon in an electric furnace operated to produce molten boron carbide and sodium.

In the preferred process for the production of sodium borohydride illustrated in the several equations above, substantially equal molar amounts of sodium carbonate and anhydrous borax are reduced with carbon to produce a reduced boron material and elemental sodium. It will be understood that other sodium boron oxide compositions such as sodium tetraborate, sodium metaborate, sodium orthoborate, or other alkali metal boron oxide materials may be employed in Equation 1. Sodium carbonate is desirably supplied along with the borax to the carbothermic reduction to provide the additional elemental sodium required to give a sodium to boron ratio of 1:1 as required for the manufacture of the sodium borohydride. It will be appreciated that the additional sodium could be purchased or provided from other sources. However, with the particular carbothermic process of copending patent application Ser. No. 613,373, it is advantageous to produce the additional sodium from low cost soda ash by simultaneously, or separately, reducing the soda ash with the anhydrous borax.

In the second step (Equations 2-a and 2-b) of the process of the invention the boron carbide and/or boron is reacted with either a hydrogen halide or a halogen to produce a gaseous stream containing boron trihalide. Generally, the halogenation will be accomplished with either chlorine or hydrogen chloride, as shown in the equations in preference to bromine or hydrogen bromide. The boron trichloride or other boron trihalide is reacted with a stoichiometric excess of hydrogen to produce a gaseous stream containing boron trichloride, hydrogen, dichloroborane and hydrogen chloride. If bromine or hydrogen bromide has been used for halogenating agent the gaseous stream will contain the bromine counterparts of the foregoing materials. The gaseous hydrogen and hydrogen halide is separated from the product stream and the dichloroborane or other dihaloborane is disproportionated to diborane and the appropriate boron trihalide. A particularly suitable process for the production of diborane in accordance with the foregoing Equation 2-a is set forth in my copending U.S. patent application Ser. No. 649,317, filed June 27, 1967, and entitled "Process for Production of Boron Halides and Diborane." A process for the production of diborane in accordance with Equation 2-b is described in my copending U.S. patent application Ser. No. 649,297, filed June 27, 1967, entitled "Process for the Production of Dihaloborane and Diborane." The foregoing patent applications relating to the production of diborane are incorporated herein by reference. Other processes for the manufacture of diboran known to the prior art may be employed, for example, the process for the manufacture of diborane utilizing a boron trichloride feed as described in the Adinoff et al. U.S. Patent No. 3,251,643.

As described in Ser. No. 649,297 diborane may be produced in accordance with Equation 2-b, utilizing the sequence of reactions which comprises reacting a halogen with a reduced solid form of boron in a first reaction zone to provide a high temperature gaseous stream containing boron trihalide. Hydrogen and recycled boron trihalide are added to the gaseous product stream to produce a composite stream wherein the hydrogen is present in an amount in excess of one mol per mol of the boron trihalide. The composite stream is passed to a second zone wherein the boron trihalide and hydrogen react to produce dihaloborane. The dihaloborane containing stream is rapidly quenched to minimize loss of boron hydrogen bonding. Thereafter, the dihaloborane is separated from the hydrogen halide and hydrogen of the stream and disproportionated into boron trihalide and the diborane product. Typically, the reaction between the halogen and reduced boron in a chlorinating reactor is conducted at a temperature in the range of about 500° C. to about 1500° C., usually in excess of 650° C. and less than 1250° C. Further details on the chlorination-hydrogenation step for the production of diborane in accordance with Equation 2-b are set forth in the pending application Ser. No. 649,297.

A preferred procedure for accomplishing the halogenation-hydrogenation step of Equation 2-a is described in my copending application Ser. No. 649,317. In the procedure described in Ser. No. 649,317 diborane is produced by reacting a hydrogen halide, preferably hydrogen chloride with a reduced solid form of boron in a first reaction zone to provide a high temperature gaseous stream containing boron trihalide and hydrogen. Additional hydrogen is added to the gaseous product stream to produce a composite stream wherein the hydrogen is present in an amount in excess of one mole per mol of the boron trihalide. The composite stream is then passed to a second zone wherein the boron trihalide and hydrogen react to produce dihaloborane. The dihaloborane containing stream is rapidly quenched to minimize loss of boron-hydrogen bonding. Thereafter, dihaloborane is separated from the hydrogen halide and hydrogen of the stream and disproportionated into boron trihalide and the diborane product. Typically, the reaction between the hydrogen halide and the reduced boron is at a temperature in the range of about 500° C. to about 1500° C., usually in excess of 750° C. and less than 1250° C. The boron trihalide formed in the disproportionation is desirably recycled for reaction with a further quantity of hydrogen to again form dihaloborane. Reference is made to the copending application Ser. No. 649,317 for further details and conditions surrounding the halogenation-hydrogenation step of Equation 2–a.

The alkali metal produced in accordance with Equation 1 is reacted with hydrogen to produce sodium hydride in accordance with Equation 3 above. Various processes are known for the production of alkali metal halide, including that described in U.S. Patent 1,958,012, Muchenfuss. The sodium hydride or other alkali metal hydride of Equation 3 may be produced by the process of the Muchenfuss patent or in accordance with my copending patent application Ser. No. 649,316, filed June 27, 1967. The alkali metal hydride product of Ser. No. 649,316 is characterized by a fine particle size which facilitates the reaction of Equation 4 above used in the production of the sodium borohydride or other alkali metal borohydride. The process of Ser. No. 649,316 involves turbulently mixing an alkali metal vapor with a cooler hydrogen gas stream and precipitously cooling to a temperature where the alkali metal and hydrogen react to form the desired alkali metal hydride, thereafter separating the unreacted hydrogen. The alkali metal hydride product may be separated as a dry powder from the processed hydrogen gas or, alternatively, the hydride can be collected as a suspension in a liquid and thus separated from the unreacted hydrogen. Preferably, the alkali metal vapor is delivered in a gas stream diluted with heated hydrogen to the precipitous cooling step with the heated hydrogen being present in the stream in a stoichiometric equivalent, or excess of that required for the hydride reaction; typically, the hydrogen will be provided in an amount up to 50% stoichiometric excess. Conditions surrounding the process of Ser. No. 649,316 will not be repeated here and reference can be made to that application for further detail.

A procedure for the production of the sodium borohydride or other alkali metal borohydride through the reaction of the sodium hydride, lithium hydride or other alkali metal hydride and diborane in accordance with Equation 4 above is described in U.S. Patent 3,029,128, Chamberlain. In the process of that invention, the alkali metal hydride is produced by reacting sodium hydride or other alkali metal hydride and diborane in a polyether having the general formula $CH_3(OC_2H_4)_nOCH_3$, where $n$ is an integer from 1 to 4. The sodium borohydride is recovered from the solution following its formation. Particularly desirable solvents include ethyleneglycoldimethylether, and diethyleneglycoldimethylether. Reference is is made to the Chamberlain patent for further details regarding the preparation of the alkali metal borohydride.

The foregoing process of the invention represents a distinct advancement over the commercial processes now practiced which require four mols of alkali metal for each mol of alkali metal borohydride produced. In the prior art processes, alkali metal or alkali metal hydride is used as the reducing agent to convert boron-oxygen bonds to boron-hydrogen bonds. Thus, for three of the boron-hydrogen bonds of the alkali metal borohydride, three mols of alkali metal have had to be employed to remove the oxygen of the boron-oxygen starting composition. In the process of the invention, only one mol of sodium or other alkali metal is required for each mol of the alkali metal borohydride produced, because inexpensive carbon is used as the reducing agent instead of high-cost alkali metal. Furthermore, in the preferred embodiment of the process for the production of sodium borohydride, one-half of the sodium is supplied by the boron source, for example, borax, with the other half coming from low-cost soda ash or, in the case of sodium metaborate, where the sodium and boron are in 1:1 molar ratio, all of the sodium is provided with the boron feed material.

Figure 2:
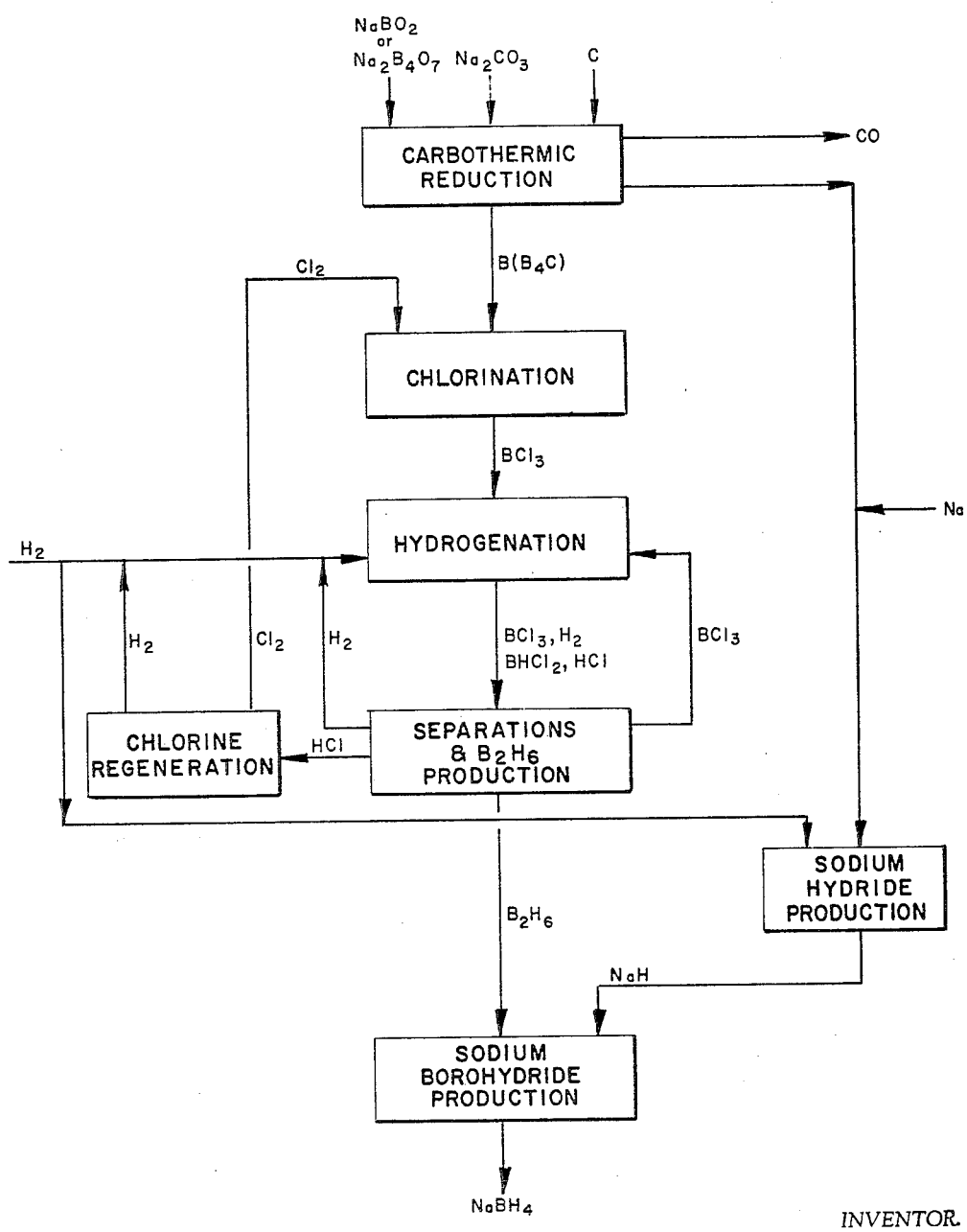

FIGURE 1 shows a flow diagram of the preferred practice of the process of the invention; and FIGURE 2 is a flow diagram of another embodiment of the process of the invention differing principally from the process of FIGURE 1 in that chlorine or other halogen is employed in the chlorination step rather than a hydrogen halide.

For illustrative purposes, the process of the invention will be described in the two figures with reference to the production of sodium borohydride. It is to be understood that the process may be used to produce other alkali metal borohydrides, such as potassium borohydride, lithium borohydride, rubidium borohydride and cesium borohydride.

The carbothermic reduction of FIGURES 1 and 2 is desirably accomplished in accordance with the process of my copending U.S. patent application Ser. No. 613,373, supra. Substantially equal mol amounts of anhydrous sodium tetraborate (borax) and sodium carbonate (soda ash), or sodium metaborate are supplied to a carbothermic reactor along with the reducing carbon. In a preferred carbothermic reduction process of the foregoing patent, the carbothermic reactor has a moving or agitated bed of electrically conductive particles which may be the same material employed for the carbon reduction. An electric current passes through the bed, heating it to a temperature in excess of 900° C. At this elevated temperature, the borax and soda ash are reduced by the accompanying carbon to liberate elemental sodium which is removed in an effluent gas stream from the bed. A reduced solid boron material is recovered from the base of the carbothermic reactor and separated from the electrically-conductive particles. The temperature of the carbothermic reactor is typically maintained in the range of 1050° C.–1150° C. In the process described in the foregoing patent application, the sodium-carbon monoxide effluent vapor stream passes from an overhead disengaging space of the carbothermic reactor to a spray condenser. In the condenser, a stable high-boiling hydrocarbon oil such as a high-boiling petroleum distillate is sprayed downwardly into the sodium-carbon monoxide stream. The vapors are precipitously cooled to about 250° C. or les, whereupon the sodium condenses and collects in a pool of metallic sodium beneath the hydrocarbon oil.

As described in U.S. patent application Ser. No. 613,373, substantially complete reduction of the borax is accomplished in the carbothermic reactor. The reduced boron and boron carbide product is removed from the base of the reactor, along with the electrically conductive particles, typically carbon balls or pellets. Separation of the reduced material from the carbon balls is accomplished and this reduced material is employed in the chlorination step illustrated in FIGURES 1 and 2. Reference is made to copending patent application Ser. No. 613,373 for further details regarding the carbothermic reduction step.

In the chlorination step of FIGURES 1 and 2 the reduced boron is transformed to boron trichloride. Typically, the chlorination reactor is operated in the range of 500–1500° C. The boron trichloride stream from the chlorination reactor is combined with recycled hydrogen and recycled boron trichloride, along with makeup hydrogen and subjected to hydrogenation conditions, to produce an effluent stream containing boron trichloride, hydrogen, dichloroborane, and hydrogen chloride.

In the process of FIGURE 1, recycled hydrogen chloride serves as the chlorinating agent. The chlorinating agent of FIGURE 2 is chlorine which is regenerated from the hydrogen chloride produced in the process. The regeneration is accomplished in accordance with known processes.

It is well known in the art, that the hydrogenation is desirably carried out with a stoichiometric excess of hydrogen, there being from 1 to 50 moles of hydrogen per mol of boron trichloride, and preferably from 3 to 15 mols per mol of boron trichloride. The hydrogenation reaction is carried on at an elevated temperature of the order from 250° C. to about 1200° C. and preferably in the range of about 650° C. to 900° C.

The effluent from the hydrogenation zone is cooled rapidly to a temperature less than 300° C., preferably less than 200° C., to preserve the more favorable dihaloborane equilibrium concentrations which exist at the higher temperatures. As explained in my copending applications, Ser. Nos. 649,317 and 649,297, the quenching of a dihaloborane stream is desirably accomplished with an inert liquid halide having a boiling point at least 25° C. in excess of the boiling point of the boron trihalide. The use of a high boiling normally liquid halide as a quenching liquid, such as titanium tetrachloride, silicon tetrachloride, or stannic chloride, permits the operation of the chlorination reactor at a low pressure and allows an appreciable reduction in refrigeration requirements. Lower boiling halides, e.g., boron trichloride, may be used in quenching as disclosed in Adinoff et al. U.S. Patent 3,251,643. The use of such low boiling quenching agents necessarily requires operation at considerably higher pressures and increased refrigeration temperatures. The foregoing quenching makes easier the separation of the hydrogen and hydrogen chloride vapors from the boron trichloride and dichloroborane, which may be accomplished as described in my copending applications Ser. Nos. 649,317 and 649,297. The dihaloborane is disproportionated to give boron trihalide and the diborane product. The boron trihalide as shown in FIGURES 1 and 2 is recycled to the hydrogenation step. Reference is made to copending U.S. patent applications Ser. Nos. 649,297 and 649,317 for further details on the chlorination, hydrogenation, separation and diborane production.

In the sodium hydride production step of the process of the invention, sodium from the carbothermic reduction is passed through a heat exchanger as described in my copending U.S. patent application Ser. No. 649,316 to effect vaporization and heating to a temperature of about 900° C. Hydrogen in approximately a 10% stoichiometric excess is supplied to a second heat exchanger and there heated to a temperature of about 900° C. The heated sodium and heated hydrogen are mixed in a composite stream introduced to a turbulent mixing zone of a reactor. Here the sodium containing stream is precipitously cooled with a large excess of cool hydrogen to a hydride reaction temperature, generally less than 450° C. and preferably to a temperature in the range of 100° C. to 400° C. The hydrogen employed for the precipitous cooling is generally initially at a temperature of less than 100° C. The cooling hydrogen is typically provided in an amount in excess of 10 mols per mol of the alkali metal vapor, preferably in an amount within the range of 10 to 100 mols per mol of the alkali metal vapor. The alkali metal hydride product is separated from the unreacted hydrogen. For further details regarding conditions, reference is made to copending patent applications Ser. No. 649,316. It will be appreciated that other processes known to the art may also be used for the production of the sodium hydride.

It will be seen that the naturally occurring raw material sodium tetraborate (borax) contains only one-half of the sodium needed for the manufacture of the sodium borohydride. In most instances, it is desirable to obtain the additional sodium by the reduction of sodium carbonate as described in the foregoing process; however, in some instances it may not be feasible to produce the additional sodium in this manner; in which case sodium may be purchased from other sources to provide the full amount needed. Where the raw material charged is sodium metaborate, the sodium and boron are present in the required mol per mol ratio.

In the processes illustrated in FIGURES 1 and 2, the sodium borohydride product is manufactured through reacting diborane with sodium hydride. Sodium hydride and the other alkali metal hydrides are soluble in few solvents, without reaction, which complicates the preparation of the alkali metal borohydrides. The procedure disclosed in Chamberlain U. S. Patent 3,029,128 may be employed in the last step of the process of the invention. Here a slurry of sodium hydride in diethyleneglycoldimethylether or ethyleneglycoldimethylether is prepared and diborane introduced to produce sodium borohydride. The reaction may be carried on at substantially atmospheric pressure and room temperature to give a substantial yield of the borohydride. The solvent is evaporated to recover a white crystalline sodium borohydride product. Other methods for the reaction of sodium hydride and diborane may be employed.

The process of the invention is preferably carried out in an integrated plant with, for example, the high temperature boron trihalide gaseous stream from the reduced boron halogenation step being directed without condensation or significant heat extraction to the hydrogenation step and with all other steps of the process being interrelated in the most economical fashion. It would be possible but usually less advantageous to carry on the halogenation at one site to produce a liquid boron trihalide which is transported to a second site where the boron trihalide is vaporized to provide the feed to the hydrogenation operation. Similarly, it may be advantageous, for example, because of power costs or raw material location, to reduce the alkali metal boron oxide composition at a first site and carry on the rest of the process at a distant second site. It will be appreciated that the nature of the process of the invention permits fragmentation into individual operations which may be conducted at diverse locations but, generally, convenience and economics will dictate that the whole process be carried on at a single location.

When sodium orthoborate is the raw material charge supplied to the carbothermic furnace, metallic sodium will be produced in more than the stoichiometric amount needed for the manufacture of sodium borohydride, and in this operation, the excess sodium may be withdrawn from the process of the invention as a valuable byproduct, or alternatively, the excess sodium may be utilized to manufacture additional sodium hydride which may then be withdrawn as a byproduct of the process. Similarly, when the raw material contains a stoichiometric excess of boron, for example, anhydrous borax, the excess boron may be removed from the process as byproduct boron or boron carbide or as byproduct boron trihalide, dihaloborane or diborane. Depending upon the alkali metal boron oxide composition being processed, and the halogenation agent used, various byproducts of elemental alkali metal, boron, boron carbide, boron trihalide, dihaloborane, diborane, and alkali metal hydride are optionally withdrawn from the process. This characteristic of the process in providing valuable byproducts constitutes another advantage of the invention.

While there has been disclosed above preferred embodiments of the process of the invention, it will be appreciated that other embodiments are possible without departing from the inventive concept herein disclosed, and defined by the claims which follow.

What is claimed is:

1. A process for the production of an alkali metal borohydride comprising:
    (1) reducing an alkali metal boron oxide composition with a carbonaceous material to produce a reduced boron material and an elemental alkali metal;
    (2) halogenating the reduced boron material with a halogenating agent selected from the group consisting of a halogen and hydrogen halide to produce boron trihalide;
    (3) reacting the boron trihalide with a stoichiometric excess of hydrogen under hydrogenating conditions to produce dihaloborane;

(4) disproportionating the dihaloborane to diborane and recovering a diborane product;

(5) reacting the alkali metal with hydrogen to produce alkali metal hydride; and (6) reacting the diborane with the alkali metal hydride to produce alkali metal borohydride.

2. A process in accordance with claim 1 wherein the halogenating agent is selected from the group consisting of chlorine and hydrogen chloride.

3. A process in accordance with claim 1 wherein the boron oxide composition is selected from the group consisting of sodium tetraborate, sodium metaborate, and sodium orthoborate.

4. A process in accordance with claim 1 wherein the alkali metal boron oxide composition comprises sodium tetraborate and sodium carbonate and is supplied to the reduction step (1).

5. A process in accordance with claim 1 wherein the carbonaceous material is carbon.

6. A process in accordance with claim 1 wherein by-products of elemental alkali metal, boron, boron carbide, boron trihalide, dihaloborane, diborane and alkali metal hydride are optionally withdrawn from the process.

7. A process for the production of an alkali metal borohydride, comprising:

(1) reducing an alkali metal boron oxide composition with carbon to produce a reduced boron material and elemental alkali metal;

(2) halogenating the reduced boron material with a halogenating agent selected from the group consisting of a halogen and hydrogen halide to produce a stream containing boron trihalide;

(3) reacting the boron trihalide with a stoichiometric excess of hydrogen under hydrogenation conditions to produce a product stream containing boron trihalide, hydrogen, dihaloborane and hydrogen halide;

(4) separating the dihaloborane from the hydrogen and hydrogen halide;

(5) disproportionating the dihaloborane to diborane and boron trihalide;

(6) recovering a diborane product by separation from the boron trihalide;

(7) reacting the alkali metal with hydrogen to produce an alkali metal hydride; and (8) reacting the diborane with the alkali metal hydride to produce an alkali metal borohydride.

8. A process in accordance with claim 7 wherein the hydrogen halide from the separation step (4) is recycled to the halogenation step (2).

9. A process in accordance with claim 7 wherein a halogen is regenerated from the separated hydrogen halide of step (4) and the regenerated halogen recycled to the halogenation step (2).

10. A process in accordance with claim 7 wherein the alkali metal boron oxide composition is anhydrous sodium tetraborate.

11. A process in accordance with claim 10 wherein sodium carbonate is supplied to the reduction step (1).

12. A process in accordance with claim 11 wherein the sodium carbonate is supplied in an amount adequate to provide sodium from step (1), in a quantity needed to form the sodium hydride of step (7) in an amount required to react with substantially all of the diborane of step (6).

13. A process in accordance with claim 7 wherein the boron oxide composition is sodium metaborate.

14. A process in accordance with claim 7 wherein the halogen is chlorine and the hydrogen halide is hydrogen chloride.

15. A process in accordance with claim 7 wherein the alkali metal boron oxide composition is sodium orthoborate and the excess boron produced is removed from the process as elemental boron or boron hydride.

16. A process in accordance with claim 7 wherein the alkali metal boron oxide composition is a lithium boron oxide composition.

17. A process in accordance with claim 7 wherein the alkali metal boron oxide composition is a potassium boron oxide composition.

18. A process in accordance with claim 7 wherein the alkali metal boron oxide composition is rubidium boron oxide composition.

19. A process in accordance with claim 7 wherein the alkali metal boron oxide composition is a cesium boron oxide composition.

20. A process in accordance with claim 7 wherein byproducts of elemental alkali metal, boron, boron carbide, boron trihalide, dihaloborane diborane and alkali metal hydride are optionally withdrawn from the process.

21. A process in accordance with claim 7 wherein the boron trihalide from the product stream of step (3) and the boron trihalide separated in step (6) are recycled to step (3).

References Cited

UNITED STATES PATENTS 3,306,704   2/1967   Campbell et al. _____ 23—204

OTHER REFERENCES

"Borax to Boranes," Advances in Chemistry, Series No. 32, American Chemical Society, Washington, D.C., 1961, pp. 1–4, 201.

Roland L. Hughes et al.: Production of the Boranes and Related Research, Academic Press, New York, 1967, pp. 6–24.

OSCAR R. VERTIZ, Primary Examiner

G. O. PETERS, Assistant Examiner

U.S. Cl. X.R.

23—204